United States Patent
Oda et al.

(10) Patent No.: US 9,705,731 B2
(45) Date of Patent: Jul. 11, 2017

(54) MEDIATION SERVER, COMMUNICATION DEVICE, AND CONNECTING METHOD

(75) Inventors: Toshikane Oda, Tokyo (JP); Shingo Murakami, Kanagawa (JP); Shinta Sugimoto, Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 996 days.

(21) Appl. No.: 13/812,687

(22) PCT Filed: Aug. 17, 2010

(86) PCT No.: PCT/JP2010/064126
§ 371 (c)(1),
(2), (4) Date: Jan. 28, 2013

(87) PCT Pub. No.: WO2012/023214
PCT Pub. Date: Feb. 23, 2012

(65) Prior Publication Data
US 2013/0124739 A1    May 16, 2013

(51) Int. Cl.
*G06F 15/16* (2006.01)
*H04L 29/08* (2006.01)
(Continued)

(52) U.S. Cl.
CPC ....... *H04L 29/08576* (2013.01); *H04W 4/005* (2013.01); *H04W 48/18* (2013.01);
(Continued)

(58) Field of Classification Search
CPC .. H04L 29/08; H04L 29/08576; H04W 48/18; H04W 4/005; H04W 76/021
(Continued)

(56) References Cited

U.S. PATENT DOCUMENTS

2005/0227692 A1    10/2005  Kawashima et al.
2009/0063187 A1*   3/2009   Johnson ............... A61B 5/0022
                                                705/2
(Continued)

FOREIGN PATENT DOCUMENTS

EP    1 467 585 A2    10/2004

OTHER PUBLICATIONS

International Search Report, PCT/JP2010/064126, Sep. 21, 2010.
(Continued)

*Primary Examiner* — Davoud Zand
(74) *Attorney, Agent, or Firm* — Myers Bigel, P.A.

(57) ABSTRACT

A mediation server for mediating subscription information to a communication device from a network operator providing network connectivity is provided. The server includes a management unit for managing context information of a communication device, which includes data relating to service provided by a network operator; an obtaining unit for obtaining device information of the communication device, which includes data needed to obtain subscription information from a network operator; a selecting unit for selecting, using the context information, a network operator that provides the best service to the communication device out of network operators that are able to provide network connectivity to the communication device; and a request unit for sending a request, with the obtained device information to the selected network operator, for subscription information which is to be used for the communication device to connect to the selected network operator as a home network operator.

15 Claims, 8 Drawing Sheets

(51) Int. Cl.
*H04W 48/18* (2009.01)
*H04W 4/00* (2009.01)
H04W 8/20 (2009.01)
H04W 76/02 (2009.01)

(52) U.S. Cl.
CPC ....... *G06F 2213/0038* (2013.01); *H04W 8/20* (2013.01); *H04W 76/021* (2013.01)

(58) Field of Classification Search
USPC .................. 709/227, 232, 233, 234, 235
See application file for complete search history.

(56) References Cited

U.S. PATENT DOCUMENTS

| | | | |
|---|---|---|---|
| 2009/0217348 A1* | 8/2009 | Salmela et al. ................... | 726/2 |
| 2010/0057485 A1* | 3/2010 | Luft ................................. | 705/1 |
| 2011/0128911 A1* | 6/2011 | Shaheen ............... | H04L 63/104 |
| | | | 370/328 |
| 2011/0268047 A1* | 11/2011 | Nath et al. .................... | 370/329 |
| 2013/0081052 A1* | 3/2013 | Levien ................. | G06F 9/5027 |
| | | | 718/106 |

OTHER PUBLICATIONS

Written Opinion of the International Searching Authority, PCT/JP2010/064126, Sep. 21, 2010.
International Preliminary Report on Patentability, PCT/JP2010/064126, Jul. 17, 2012.
3GPP TR 33.812 V9.2.0 (Jun. 2010) Technical Report, 3$^{rd}$ Generation Partnership Project; Technical Specification Group Services and System Aspects; Feasibility study on the security aspects of remote provisioning and change of subscription for Machine to Machine (M2M) equipment (Release 9), Jun. 22, 2010, 87 pp.

\* cited by examiner

MEDIATION SERVER, COMMUNICATION DEVICE, AND CONNECTING METHOD

CROSS REFERENCE TO RELATED APPLICATION

This application is a 35 U.S.C. §371 national stage application of PCT International Application No. PCT/JP2010/064126, filed on 17 Aug. 2010, the disclosure and content of which is incorporated by reference herein in its entirety. The above-referenced PCT International Application was published in the English language as International Publication No. WO 2012/023214 A1 on 23 Feb. 2012.

TECHNICAL FIELD

The present invention generally relates to a mediation server, a communication device, and a connecting method.

BACKGROUND

The use of downloadable USIM to establish the credentials of users and terminals is well known, and described in the 3GPP TR 33.812 V9.2.0. TR 33.812 V9.2.0 discusses remote provisioning of subscription for Machine-to-Machine equipments (M2ME). The provisioning includes initial provisioning and re-provisioning. According to one of the solutions described in TR 33.812, an M2ME, which is a kind of a communication device, is provided with a temporary private identity called a Provisional Connectivity ID (PCID). The PCID follows the same format as an International Mobile Subscriber Identity (IMSI), and a network operator identified by the PCID is called a Registration Operator (RO). The M2ME accesses the RO using the PCID, and requests for subscription information called a Machine Communication Identity Module (MCIM). Upon request, the RO accesses another network operator called a Selected Home Operator (SHO) which provides the M2ME with network connectivity enablement, receives the MCIM issued by the SHO, and forwards the MCIM to the M2ME.

TR 33.812 V9.2.0 provides a solution in which a user of an M2ME specifies an SHO. However, it is sometimes hard for the user to select the network operator for an SHO which provides the best service for the M2ME, for example, in case where Home Operator selection needs more specific information of the latest context information of the M2ME such as radio access condition. Furthermore, the solutions provided by TR 33.812 V9.2.0 do not give anything for provisioning of more than one M2ME at a time or during certain time. If the user uses the solutions, the user has to initiate provisioning for different M2MEs on a "one-by-one" basis. It is cumbersome for the user to take separate actions for each of M2MEs, especially in case that the user wants to switch subscription for the devices from the present operator to another operator simultaneously.

SUMMARY

The present invention is intended to address the above-described problem, and it is a feature thereof to introduce an improved technology for providing a communication device with subscription information via a network.

Note that "subscription information" is also referred to as the MCIM in the present application.

According to the first aspect of the present invention, there is provided a mediation server for mediating subscription information to a communication device from a network operator providing network connectivity, comprising: a management unit configured to manage context information of a communication device, wherein the context information includes data relating to service provided by a network operator to a communication device; an obtaining unit configured to obtain device information of the communication device, wherein the device information includes data needed to obtain subscription information from a network operator; a selecting unit configured to select, using the context information of the communication device whose device information is obtained, a network operator that provides the best service to the communication device out of network operators that are able to provide network connectivity to the communication device; and a request unit configured to send a request, with the obtained device information to the selected network operator, for subscription information which is to be used for the communication device to connect to the selected network operator as a home network operator of the communication device.

According to the second aspect of the present invention, there is provided a communication device comprising: an obtaining unit configured to obtain context information, wherein the context information includes data relating to service provided by a network operator to the communication device; a transmitting unit configured to transmit, to a mediation server, device information of the communication device and the obtained context information, wherein the device information includes data needed to obtain subscription information from a network operator; a receiving unit configured to receive subscription information selected by the mediation server, wherein the subscription information is used for connecting to a network operator that provide the best service to the communication device; and a network unit configured to connect to the network operator using the received subscription information.

According to the third aspect of the present invention, there is provided a method for connecting a communication device to a network operator, comprising: obtaining context information of a communication device, wherein the context information includes data relating to service provided by a network operator to the communication device; obtaining device information of the communication device, wherein the device information includes data needed to obtain subscription information from a network operator; selecting, using the obtained context information, a network operator that provides the best service to the communication device out of network operators that are able to provide network connectivity to the communication device; requesting, to the selected network operator, subscription information used for the communication device to connect to the selected network operator, by sending the obtained device information; obtaining the subscription information from the selected network operator; and connecting to the selected network operator using the obtained subscription information.

According to the fourth aspect of the present invention, there is provided a mediation server for mediating subscription information to a plurality of communication devices from a network operator providing network connectivity, comprising: a receiving unit configured to receive request for provisioning, from a communication device, with device information of the communication device, wherein the device information includes data needed to obtain subscription information from a network operator; a group determination unit configured to specify a group of communication devices, the group including the communication device from which the request is received; a request unit configured to send a request, to a network operator, for subscription information used for the communication devices in the group to connect to the network operator, with the device information of the communication devices in the group.

Further features of the present invention will become apparent from the following description of exemplary embodiments with reference to the attached drawings, in which like reference characters designate the same or similar parts throughout the figures thereof.

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

Hereinafter, the term "provisioning" includes both initial provisioning and re-provisioning. The initial provisioning is performed for initially obtaining subscription information from a network operator. The re-provisioning is performed for changing subscription information from a current network operator to another network operator.

Figure 1:
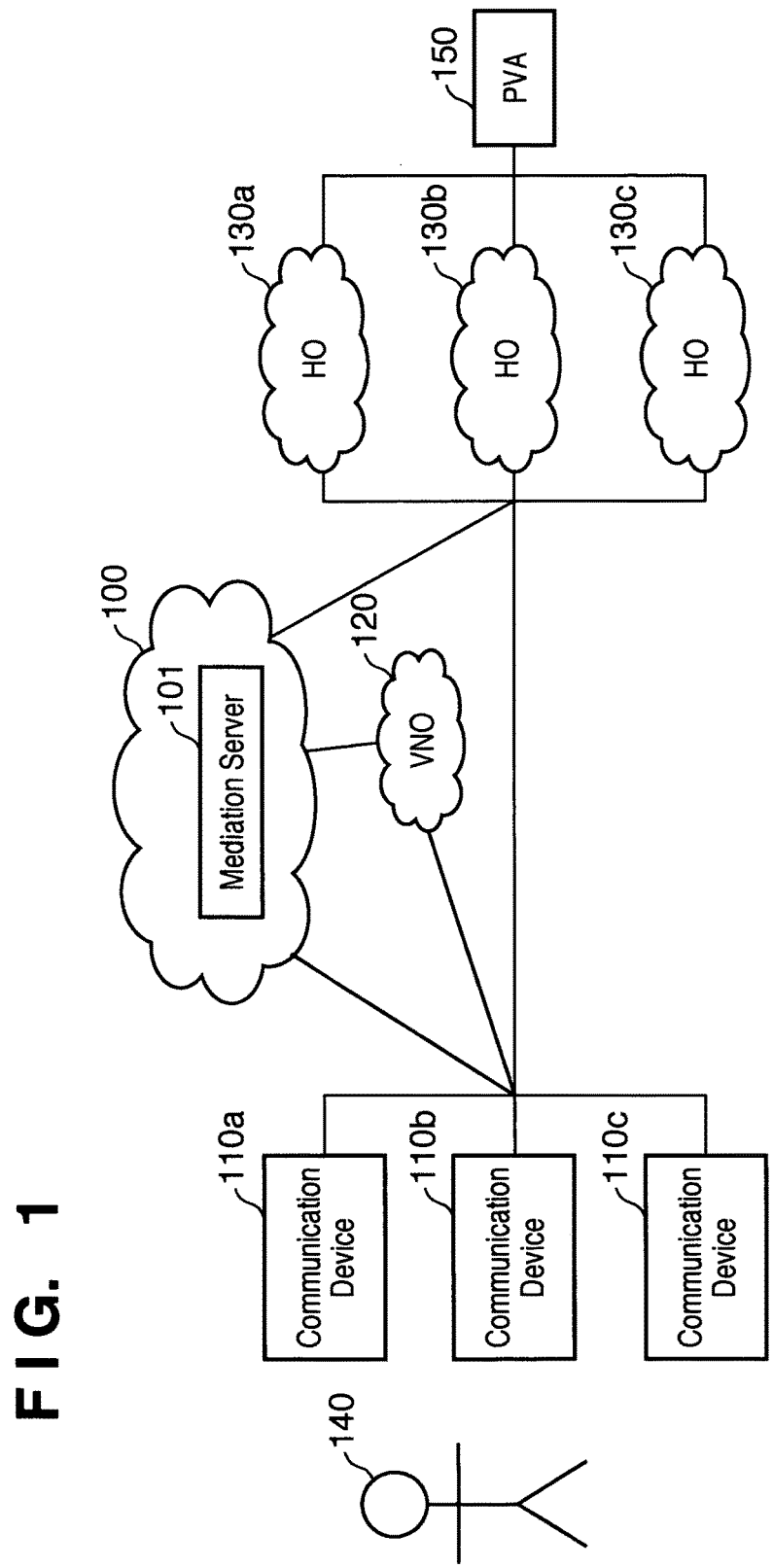
FIG. 1 illustrates an exemplary overview of an environment according to an embodiment of the present invention.

FIG. 1 illustrates an exemplary overview of an environment according to an embodiment of the present invention. The environment may include a plurality of communication devices 110a-110c, a registration operator (RO) 100, a visited network operator (VNO) 120, a plurality of home operators (HO) 130a-130c, and a platform validation authority (PVA) 150. The RO 100 may operate a mediation server 101. Hereinafter, the communication devices 110a-110c are collectively referred as a communication device 110. The communication device 110 is a device for communicating with the VNO 120 and the mediation server 101, and contains a Provisional Connectivity ID (PCID). The communication devices 110a-110c may be owned by a user 140. Examples of the communication device 110 include a mobile terminal, a digital photo frame, a navigation and information device in a car, and a monitoring sensor. Because the PCID identifies the temporary subscription pre-provisioned in the communication device 110, the PCID can be used as a piece of information for identifying the communication device 110 which is pre-provisioned with the PCID. The communication device 110 is intended to obtain a Machine Communication Identity Module (MCIM) of one of the HOs 130a-130c as subscription information. Although the communication device 110 corresponds to a Machine-to-Machine equipment (M2ME) described in TR 33.812, the term "communication device" is used in place of the term "M2ME" because communication made by the communication device 110 is not limited to machine-to-machine communication.

The VNO 120 provides temporary 3GPP network access to the communication device 110, where authentication using credentials such as a PCID may be required. The VNO 120 may provide full or restricted connectivity during initial access. The VNO 120 may provide connectivity to a selected HO, when the selected HO and the VNO 120 are distinct operators.

The mediation server 101 is a server for mediating an MCIM to the communication device 110 from any one of the HOs 130a-130c. The mediation server 101 may provide initial connectivity to the communication device 110 and to provide registration and provisioning functions for the communication device 110. The RO 100 operating the mediation server 101 is identified by the PCID and serves the communication device 110 to enable the communication device 110 to access to a 3GPP network in order to obtain the MCIM.

The HOs 130a-130c are network operators which have the capability of providing network connectivity to the communication device 110. One of the HOs 130a-130c is selected to provide network connectivity services for the communication device 110. The selected HO is called an SHO (Selected Home Operator). The SHO operates as follows:

Has a subscription contract with the user 140;

Authorizes the mediation server 101 to provision the communication device 110 with MCIM parameters, for example, generated by the HO;

In case of re-provisioning and while there is an operational connection to a communication device 110, provides connectivity service between the communication device 110 and the mediation server 101 for re-provisioning of an MCIM to the communication device 110; and In case of re-provisioning and while there is an operational connection to a communication device 110, provides connectivity service for the attestation of the communication device 110 with the help of the PVA 150 for re-provisioning of the MCIM application or credentials.

The PVA 150 validates the credentials used to verify the communication device 110 as a trusted platform. The PVA 150 may also issue these credentials. The PVA 150 supports the following:

Validation of platform credentials that assert the authenticity and integrity of the communication device 110 as a platform to hold the MCIM application and credentials;

Providing the HO with information related to the success or failure of the validation of the communication device 110.

Obtaining new platform credentials when required, for example, after a remote update of the communication device 110.

Figure 2:
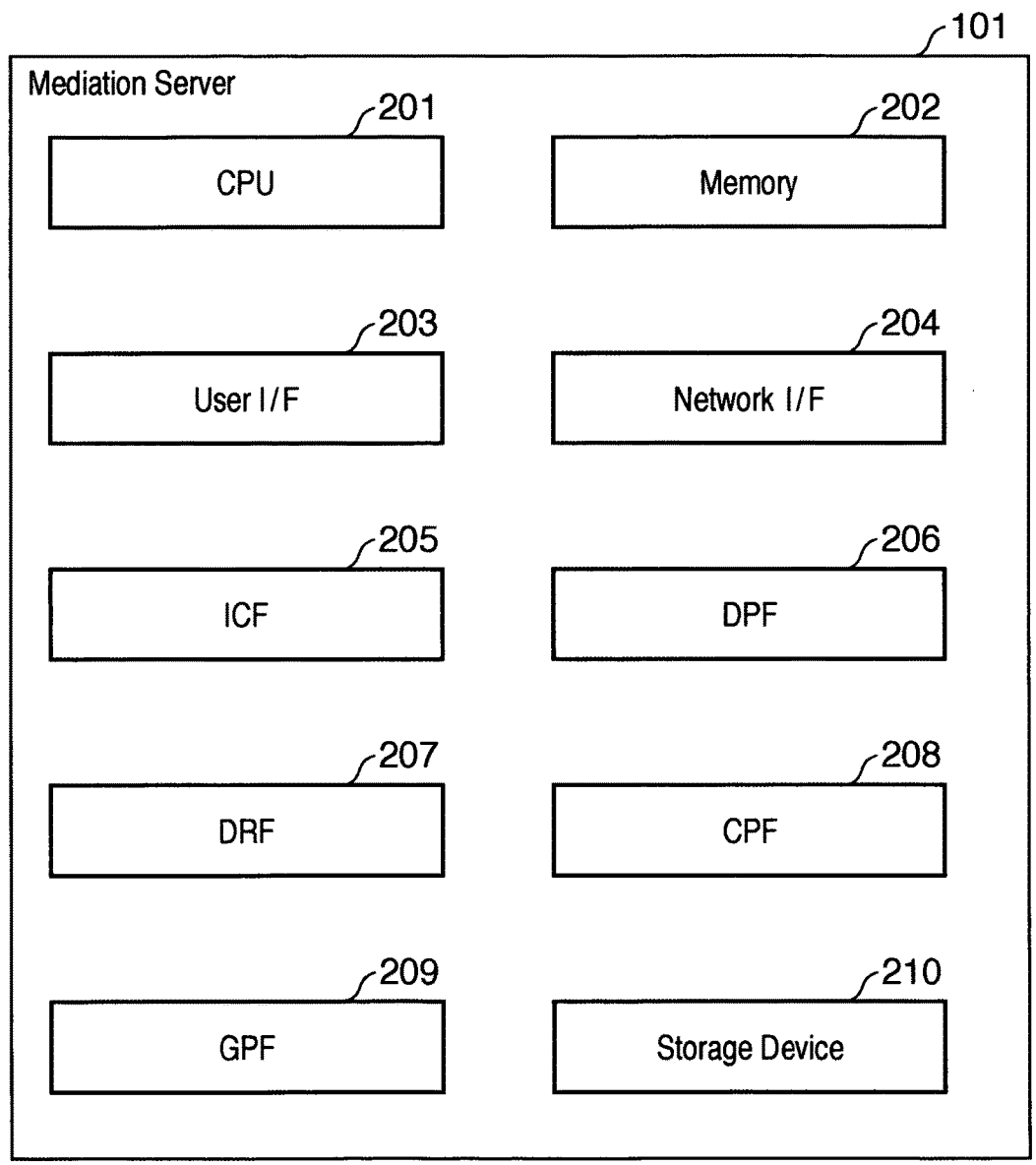
FIG. 2 illustrates an exemplary functional block diagram of a mediation server according to an embodiment of the present invention.

FIG. 2 is an exemplary functional block diagram of the mediation server 101. The mediation server 101 may comprises a CPU 201, a memory 202, a use interface (I/F) 203, a network interface (I/F) 204, an initial connectivity function (ICF) 205, an MCIM download and provisioning function (DPF) 206, a discovery and registration function (DRF) 207, a context-based provisioning function (CPF) 208, a group provisioning function (GPF) 209, and a storage device 210. Although the mediation server 101 is illustrated as a single node in FIG. 1, the functions of the mediation server 101 may be separated in two or more nodes.

The CPU 201 controls overall operations of the mediation server 101. The memory 202 stores computer programs and data used for operations of the mediation server 101. The user interface 203 provides an interface with humans such as the user 140 and includes a display, a keyboard, a mouse, and the like, for example. The network interface 204 provides an interface with other devices such as the communication device 110, a base station in the VNO 120, servers in the HOs 130a-130c, and the like.

The ICF 205 provides connectivity services (at layers above the basic network access provided by the VNO 120). The ICF 205 provides network connectivity for the communication device 110 to request downloading and provisioning of MCIM credentials and applications from the DPF 206 via the VNO 120.

The DPF 206 is a function for managing the downloading and provisioning of the MCIM applications and credentials to the communication device 110. In order to perform the secure provisioning of the MCIM applications and their parameters to the communication device 110, the DPF 206 may support functions specified in 3GPP TR 33.812 V9.2.0.

The DRF 207 helps the communication device 110 to discover and register with any one of the HOs 130a-130c. Address resolution is included within the DRF 207.

The CPF 208 may select an HO that provides the best service to the communication device 110 out of the HOs 130a-130c as a SHO, based on context information of the communication device 110. The context information includes data relating to service provided by the HO 130a-130c to the communication device 110. Examples of the context information may include radio signal condition measured at the communication device 110 which may include radio strength around the communication device 110, Quality of Service (QoS) of an access link for a communication device 110, and radio interference. Examples of the context information may also include capabilities of the communication device 110. Examples of the capabilities may include supporting communication technology types such as HSDPA, HSUPA, LTE, WiFi, Bluetooth, Zigbee, Ethernet (or other fixed access technology), Circuit Switched voice communications, and video communications (real-time video, downloadable video, etc.). Examples of the capabilities may also include hardware/software capabilities such as screen size, memory size, and OS types (for example, Android OS), supporting framework types (for example, OSGi framework), and supporting sensor types (for example, NFC such as Felica and Mifare, environmental sensors, and health-related sensors). Examples of the capabilities may also include location, velocity, and acceleration of the communication device 110. Examples of the context information may also include price information about the connectivity service and applications offered by the HO 130a-130c pertaining to the communication device 110 (or a group of communication devices 110a-110c) and the user 140. Examples of the context information may also include the information of traffic handling policy about the connectivity service and applications offered by the HO 130a-130c pertaining to the communication device 110 and the user 140. Example of the traffic handling policy is a service priority level such as priority in terms of packet transfer. Examples of the context information may also include the information of network congestion status of the HO 130a-130c which is predicted as network condition experienced by the communication device 110. This type of context information may be informed by the HO 130a-130c to an information database center.

Figure 9:
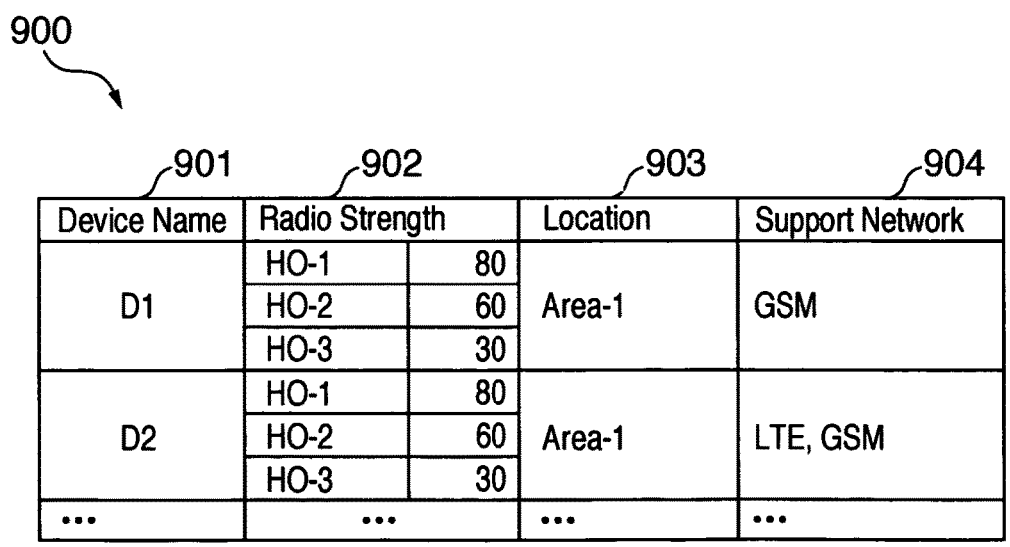
FIG. 9 illustrates an exemplary context information database.

The context information may be managed with a context information database stored in the storage device 210. FIG. 9 illustrates an exemplary context information database 900. Device Name 901 represents a name of the communication device 110. An identifier such as PCID may be used to representing Device Name 901. The context information database 900 includes Radio Strength 902, Location 903, and Support Network 904 as context information, but items managed by the context information database is not limited to these types of information shown in FIG. 9. Radio Strength 902 represents radio strength from each HO 130a-130c for each communication device 110. As shown in FIG. 9, some of context information may be managed for each HO per each communication device 110. Location 903 represents the current location of the communication device 110. The Support Network 904 represents a network type supported by the communication device 110.

The CPF 208 may receive context information from the communication devices 110 periodically in order to manage the context information database and may request the latest context information to the communication devices 110 in order to update the context information database. The CPF 208 may receive context information pertaining to the communication device 110 from other entities such as the HO 130a-130c. The CPF 208 may request the latest context information pertaining to the communication device 110 to the HO 130a-130c.

The GPF 209 may perform group-based provisioning. The user 140 may be motivated to maintain a group of communication devices 110a-110c so as to manage the communication devices 110a-110c efficiently. The communication devices 110a-110c may be grouped based on various criteria. For instance, the user may want to maintain a group of the communication devices 110a-110c which have subscription from the same SHO.

Figure 8:
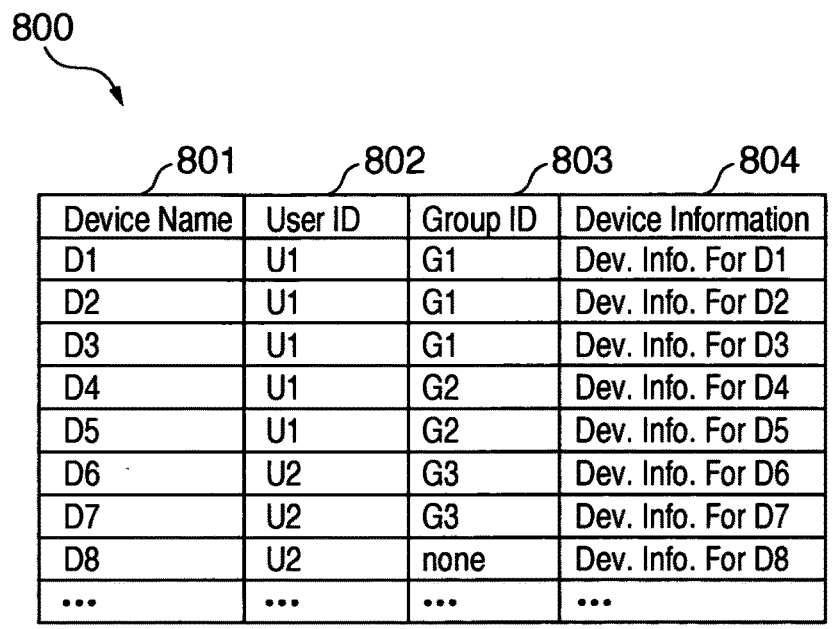
FIG. 8 illustrates an exemplary group information database.

The group information may be managed with a group information database stored in the storage device 210. FIG. 8 illustrates an exemplary group information database 800. Device Name 801 represents a name of the communication device 110. An identifier such as PCID may be used to represent Device Name 801. Other information which identifies the device such as a vendor name and serial number may be used to represent Device Name 801. User ID 802 represents an identifier assigned for each user. In the example shown in FIG. 8, a user whose ID is "U1" has six communication devices whose name are "D1" to "D6". Group ID 803 represents an identifier assigned for each group of communication devices. In the example shown in FIG. 8, the user whose ID is "U1" has two groups "G1", which is comprised of "D1" to "D4", and "G2", which comprised of "D5" and "D6". Device Information 804 represents device information of each communication device 110.

Figure 3:
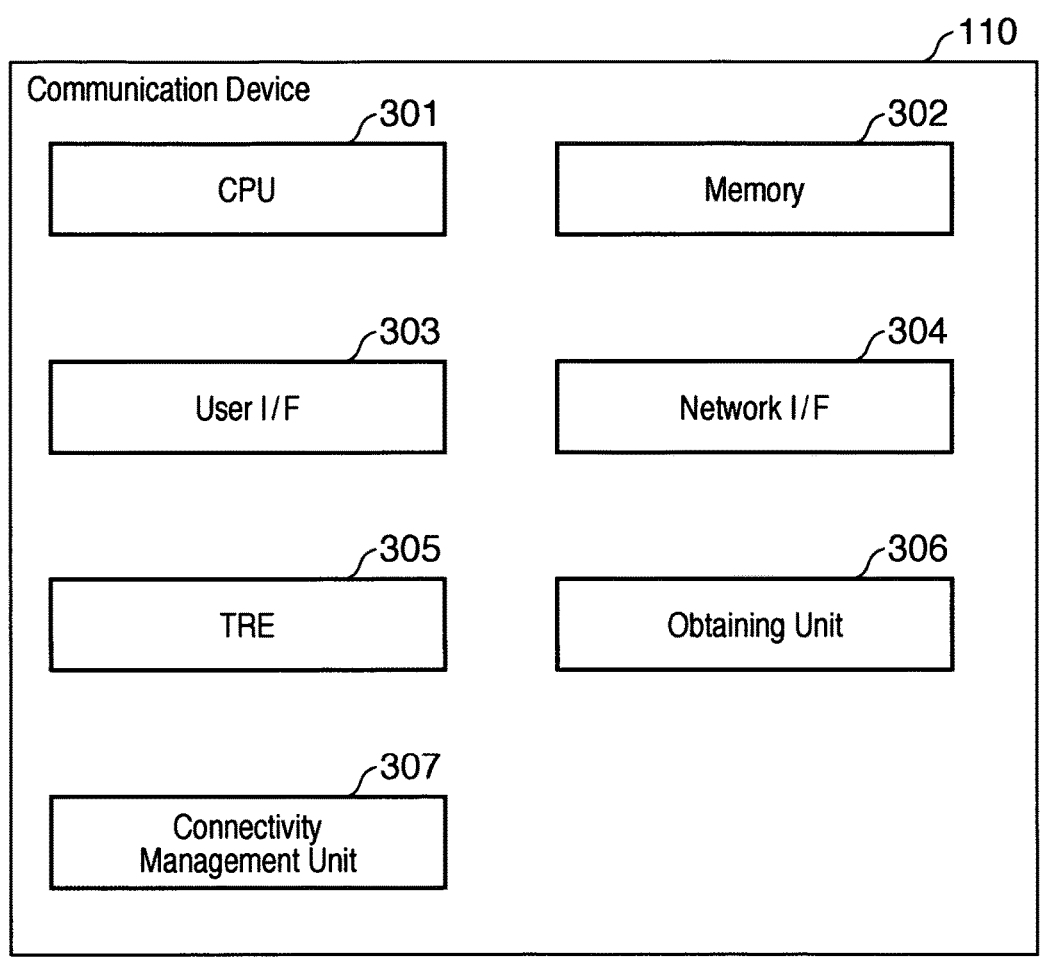
FIG. 3 illustrates an exemplary functional block diagram of a communication device according to an embodiment of the present invention.

FIG. 3 is an exemplary functional block diagram of the communication device 110. The communication device 110 may comprise a CPU 301, a memory 302, a use interface (I/F) 303, a network interface (I/F) 304, a trusted environment (TRE) 305, an obtaining unit 306, and a connectivity management unit 307.

The CPU 301 controls overall operations of the communication device 110. The memory 302 stores computer programs and data used for operations of the communication device 110, and a PCID.

A PCID may be pre-installed to the TRE 305 and have contact information of the mediation server 101. Thus, the user 140 may not need to know contact address of the mediation server 101.

The user interface 303 provides an interface with a human such as the user 140 and includes a display, a keypad, a speaker, and the like, for example. The network interface 304 provides an interface with other devices such as the mediation server 101, a base station in the VNO 120, servers in the HOs 130a-130c, and the like. The TRE 305 provides some hardware and software protection and separation for the provisioning, storage, execution, and management of MCIMs. The obtaining unit 306 obtains the context information, for example, by retrieving information such as memory size and screen size from the memory 302, and by measuring radio signal condition, etc. The connectivity management unit 307 manages network connectivity with the SHO selected from HOs 130a-130c.

MCIM provisioning procedures will now be described with reference to FIGS. 4 to 7. The present invention may apply to both initial provisioning and re-provisioning. The re-provisioning may include two deployments, that is, re-provisioning by reverting to the pristine state procedure (initial provisioning procedure) and re-provisioning using connectivity provided by the current SHO. The CPU included in each device executes computer programs stored in memory of each device to process operations in each procedure.

Figure 4:
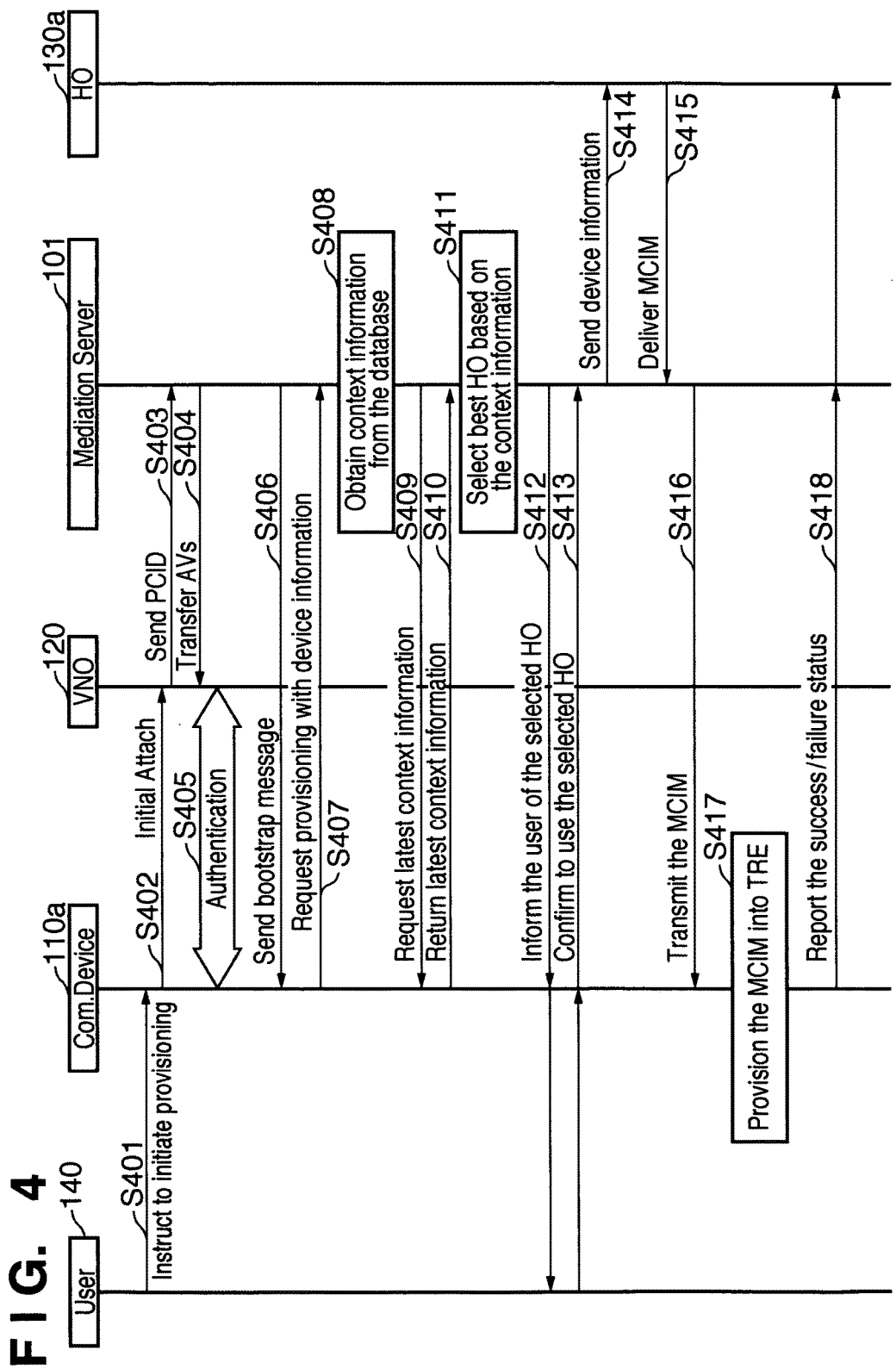
FIG. 4 illustrates a sequence diagram illustrating an MCIM provisioning procedure according to an embodiment of the present invention.

FIG. 4 is an exemplary sequence diagram illustrating an MCIM provisioning procedure according to an embodiment of the present invention. According to this embodiment, it is assumed that one of the communication devices 110, for example the communication device 110a, is provisioned. FIG. 4 shows a procedure applied for both initial provisioning and re-provisioning by reverting to the pristine state procedure because these procedures are similar.

In step S401, the user 140 instructs the communication device 110a to initiate initial provisioning or re-provisioning via, for example, the user interface 303 of the communication device 110a. The user 140 may access and instruct the communication device 110a via a wide area network in order to make the instruction.

In step S402, the connectivity management unit 307 transmits a PCID of the communication device 110a to the VNO 120 so as to attach to a network operated by the VNO 120.

In step S403, the VNO 120 sends the PCID to the mediation server 101 and the ICF 205 in the mediation server 101 receives the PCID. In step S404, the ICF 205 queries the temporary-access credential associated with the PCID, generates Authentication Vectors (AVs), and transfers the AVs to the VNO 120. In step S405, the VNO 120 uses the transferred AVs to authenticate the communication devices 110a via, for example, AKA (Authentication and Key Agreement) in 3GPP.

In step S406, the DRF 207 sends the Bootstrap message to the communication device 110a. In the message, the DRF 207 includes the IP connectivity parameters (NAPDEF), the address of the DPF 206 (Server URL), the context of the MCIM application provision and the context of the M2M application provision.

In step S407, the connectivity management unit 307 transmits a request for provisioning with device information. The device information may include data needed to obtain MCIM from an SHO, which will be selected from HOs 130a-130c in step S411. Examples of the device information include platform validation information, contact address (for example, MSISDN) of the communication devices 110a, an identity of the communication device 110a, and authorization token. In step S408, the CPF 208 accesses the context information database 900 to retrieve the context information of the communication device 110a. The CPF 208 may decide to obtain the latest context data of the communication device 110a. In this case, in step S409, the CPF 208 requests the communication device 110a for the latest context information. In step S410, the obtaining unit 306 in the communication device 110a obtains the latest context information and returns the latest context information to the CPF 208. In addition to or instead of the request to the communication device 110a in step S409, the CPF 208 may request the HOs 130a-130c for the latest context information. In this case, the HOs 130a-130c return the latest context information to the CPF 208 in step S410.

In step S411, the CPF 208 selects the best HO as an SHO that provides best service to the communication device 110a, for example the HO 130a, out of the HOs 130a-130c based on the context information of the communication device 110a. For example, the CPF 208 may select an HO which has the best radio strength. An example is to use the principle that the CPF 208 checks the value of radio strength of radio link between each of the HO 130a-130c and the communication device 110a and selects the HO with the highest value (strongest radio signal strength) from the HOs. Another example is to select, from the HOs, the HO that provides the highest value for the worst radio signal strength among the radio links for the communication device 110a. The CPF 208 may combine some types of the context information to select the best HO as the SHO for the communication device 110. For example, when the communication device 110a only supports GSM, the CPF 208 may select an HO which has the best radio strength among the HOs supporting GSM. The CPF 208 may select, as the SHO, the HO that provides the above-mentioned worst radio strength value which are greater than a pre-defined lower-limit, and also offers the lowest total price for the subscription for the communication device 110a. The CPF 208 may select, as the SHO, the HO that provides the worst radio signal strength which exceeds the lower-limit, provides the highest radio strength, and provides an application that fits to the capabilities of the communication devices 110a. An example in terms of using the device capabilities is that the CPF 208 may select the HO 130a that provides both IMS-based Instant Messaging service and SMS if the communication device 110a supports both of the services and if the other HOs 130b and 130c provide only SMS. The CPF 208 may select, as the SHO, the HO that provides the worst radio signal strength which is greater than a required lower-limit value, provides an image push service which supports the screen size of the communication device 110a, and offers the lower total price for subscriptions for the communication device 110a. Location information of the communication device 110a may be used to select the best HO, for example, in terms of radio coverage. In case that the communication device 110a is a moving device, location and movement direction and velocity of the communication device 110a may be used to select the best HO in terms of radio coverage area in the movement direction. As seen from these examples, the CPF 208 may use some or all the available pieces of context information and use the policy or logics to select the best HO from the evaluation of the used context information. The criteria to be used for the HO selection for the communication devices 110*a* may be pre-configured by the user 140 at the time of configuration, pre-configured by the RO 100, or designated by the user 140 and transferred to the CPF 208 at the time of initiating the provisioning.

In step S412, the CPF 208 may inform the user 140 of the selected HO 130*a* via the communication device 110*a*. For example, the communication device 110*a* receives the selected HO 130*a* from the CPF 208 and presents the user 140 via the user interface 203. In step S413, the user 140 may confirm to use the selected HO 130*a* as an SHO to the CPF 208. For example, the communication device 110*a* receives decision of the user 140 via the user interface 203, such as agreement or disagreement to use the selected HO 130*a* as an SHO and transfers the decision to the CPF 208. When the CPF 208 receives disagreement from the user 140, the CPF 208 may cancel the provisioning procedure or present the next best HO to the user 140. When the CPF 208 receives agreement from the user 140, the CPF 208 may continue the provisioning procedure.

In step S414, the DPF 206 connects to the selected HO 130*a* and relays the device information, which has been received at step S402, to the selected HO 130*a*. In step S415, the selected HO 130*a* delivers an MCIM object including an encrypted MCIM to the DPF 206 and authorizes provisioning of the MCIM application to the communication device 110*a*. In step S416, the DPF 206 downloads the MCIM object to the communication device 110*a*. In step S417, the connectivity management unit 307 provisions the downloaded MCIM object into the TRE 305 and the TRE 305 decrypts the MCIM object using the TRE platform Key to obtain the MCIM. After this step, the communication device 110*a* can attach to the network provided by the selected HO 130*a* using the MCIM. In step S418, the communication device 110*a* reports the success/failure status of the provisioning to the selected HO 130*a* via the DPF 206.

Figure 5:
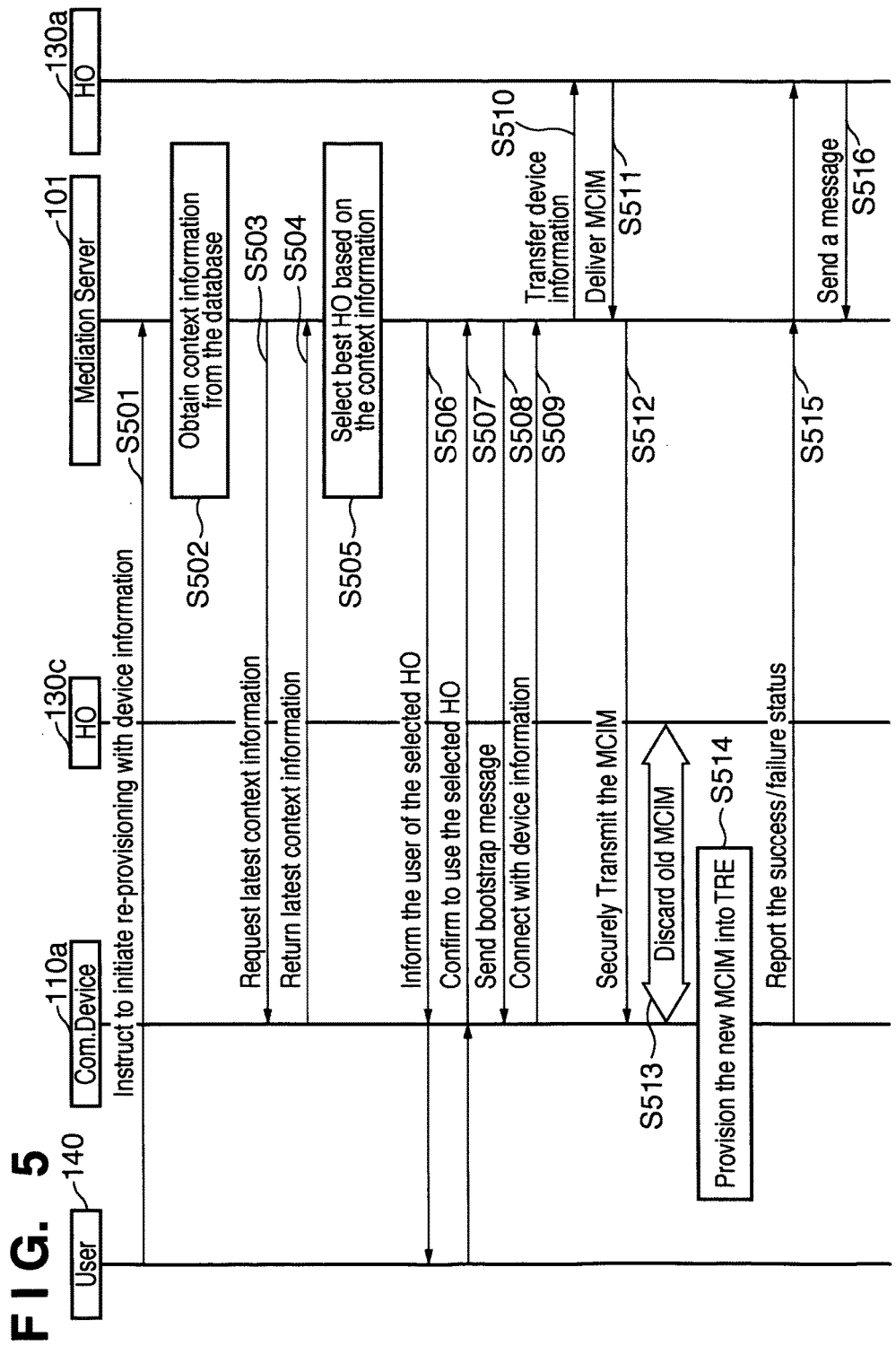
FIG. 5 illustrates a sequence diagram illustrating an MCIM re-provisioning procedure according to an embodiment of the present invention.

FIG. 5 is an exemplary sequence diagram illustrating an MCIM re-provisioning procedure according to another embodiment of the present invention. According to this embodiment, it is assumed that one of the communication devices 110, for example the communication device 110*a*, is re-provisioned using connectivity provided by the current SHO, for example the HO 130*c*.

In step S501, the user 140 instructs the communication device 110*a* to initiate re-provisioning with the device information of the communication devices 110*a* via, for example, the user interface 303 of the communication device 110*a*.

Steps S502 to S507 are similar to steps S408 to S413 and thus explanation of these steps is omitted.

In step S508, the DRF 207 sends bootstrap via the HO 130*c*, which is the current SHO. The bootstrap instructs the communication device 110*a* to contact the DPF 206. In step S509, the connectivity management unit 307 of the communication device 110*a* connects to the DPF 206 for provisioning of a new MCIM and sends the device information. In step S510, the DRF 207 transfers the device information of the communication device 110*a* to the selected HO 130*a*. In step S511, the selected HO 130*a* sends an MCIM and an authorization token to the DPF 206. In step S512, the DPF 206 securely sends the MCIM and the authorization token of the selected HO 130*a* to the communication device 110*a* using the connectivity provided by the HO 130*c*.

In step S513, the connectivity management unit 307 discards the current MCIM of the current SHO (the HO 130*c*). In step S514, the connectivity management unit 307 provisions the MCIM of the selected HO 130*a* into the TRE 305. After this step, the communication device 110*a* can attach to the network provided by the selected HO 130*a* using the MCIM. In step S515, the communication device 110*a* reports the success/failure status of the provisioning to the selected HO 130*a* via the DPF 206. In step S516, the selected HO 130*a* sends a message to the DRF 207 to register the communication device 110*a* as "subscribing to" the selected HO 130*a*.

Figure 6:
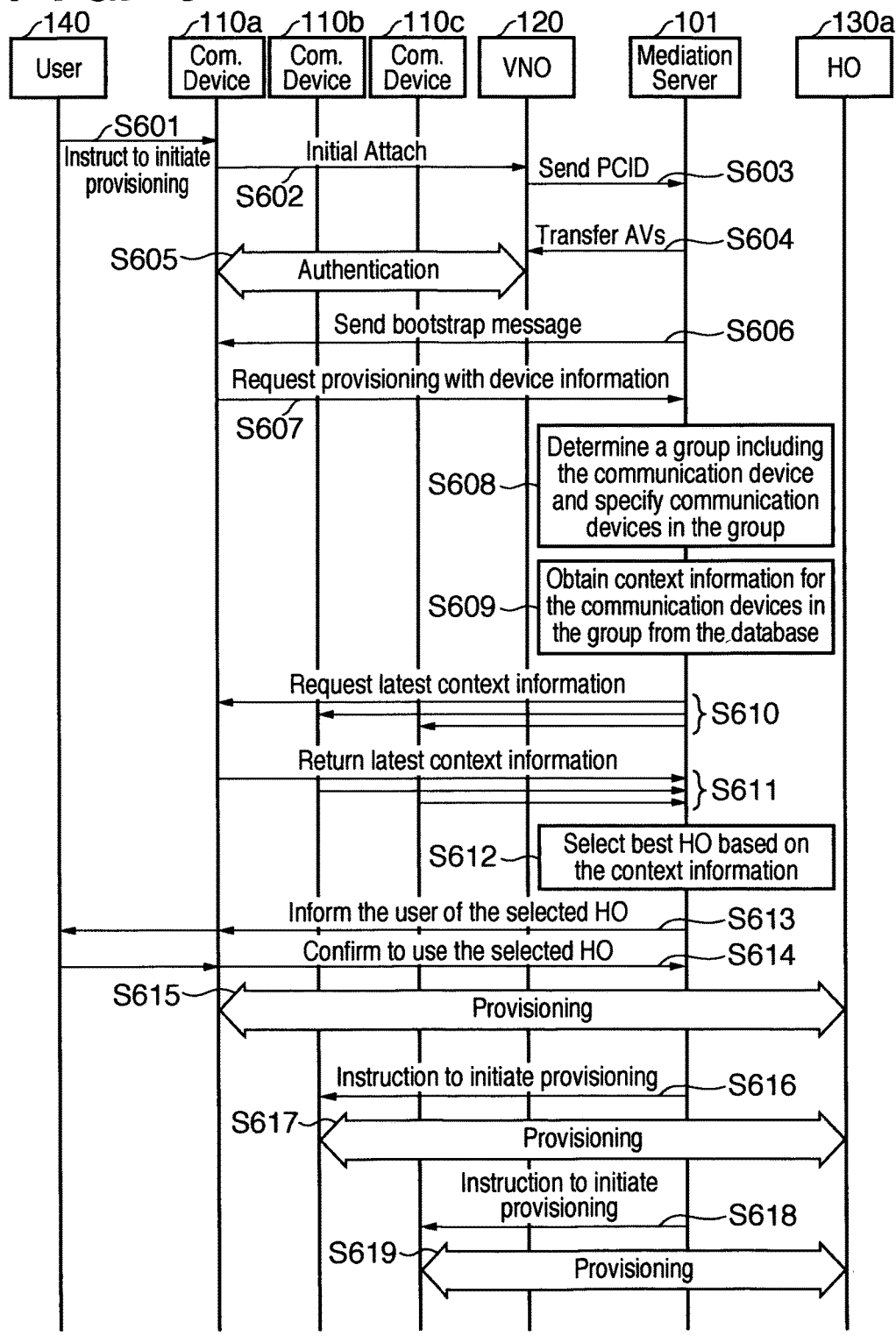
FIG. 6 illustrates a sequence diagram illustrating an MCIM provisioning procedure according to another embodiment of the present invention.

FIG. 6 is an exemplary sequence diagram illustrating an MCIM provisioning procedure according to another embodiment of the present invention. According to this embodiment, it is assumed that a group of the communication devices 110, for example the communication devices 110*a*-110*c*, are provisioned. FIG. 6 shows procedures of both initial provisioning and re-provisioning by reverting to the pristine state procedure because these procedures are similar.

In step S601, the user 140 instructs the communication device 110*a*, which may be any one of the communication devices 110*a*-110*c* included in a group, to initiate group-based initial provisioning or re-provisioning via, for example, the user interface 303 of the communication device 110*a*. The user 140 may access and instruct the communication device 110*a* via a wide area network in order to make the instruction.

Steps S602 to S606 are similar to steps S402 to S406 and thus explanation of these steps is omitted. In step S607, the connectivity management unit 307 transmits a request for group-based provisioning with the device information of the communication device 110*a*.

In step S608, the GPF 209 determines a group including the communication device 110*a* by accessing the group information database 800 and specifies the communication devices 110*a*-110*c* in the group.

In step S609, the CPF 208 retrieves context information for each communication device 110 included in the group. Similar to steps S409 and S410, the CPF 208 may request each communication device 110*a*-110*c* in the group for the latest context information in steps S604 and S605.

In step S610, the CPF 208 selects the best HO as an SHO, for example the HO 130*a*, which is commonly used for all of the communication devices 110*a*-110*c* in the group, based on the context information of all of the communication devices 110*a*-110*c*. An example is to use the principle that the CPF 208 checks the value of radio strength of radio link between each of the HO 130*a*-130*c* and each of the communication devices 110*a*-110*c*, takes the average of the radio strength values over all the communication devices 110*a*-110*c* for each of the candidate HO 130*a*-130*c*, and selects the HO with the highest average value (strongest radio signal strength) from the HOs. Another example is to select, from the HOs, the HO that provides the highest value for the worst radio signal strength among the radio links for the communication devices 110*a*-110*c*. The CPF 208 may select, as the SHO, the HO that provides the above-mentioned average and worst radio strength values which are greater than pre-defined lower-limits, respectively, and also offers the lowest total price for the subscription for the communication devices 110*a*-110*b*. The CPF 208 may select, as the SHO, the HO that provides the worst radio signal strength which exceeds the lower-limit, provides the highest average radio strength, and provides an application that fits to the capabilities of all the communication devices 110a-110c. An example in terms of using the device capabilities is that the CPF 208 may select the HO 130a that provides both IMS-based Instant Messaging service and SMS if all the communication devices 110a-110c support both of the services and if the other HOs 130b and 130c provide only SMS. The CPF may select, as the SHO, the HO that provides the worst radio signal strength which is greater than a required lower-limit value, provides an image push service which supports all the different screen sizes of the communication devices 110a-110c, and offers the lower total price for subscriptions for all the communication devices 110a-110c. As seen from these examples, the CPF 208 may use some or all the available pieces of context information and use the policy or logics to select the best HO from the evaluation of the used context information. The criteria to be used for the HO selection for the communication devices 110a-110c may be pre-configured by the user 140 at the time of configuration, pre-configured by the RO, or designated by the user 140 and transferred to the CPF 208 at the time of initiating the provisioning.

Steps S613 to S615 are similar to steps S412 to S418 and thus explanation of these steps is omitted. In step S616, the GPF 209 instructs the communication device 110b to initiate provisioning to the selected HO 130a. In step S617, the connectivity management unit 307 in the communication device 111b performs provisioning to the selected HO 130a by performing steps S407 and S414 to S418. In step S618, the GPF 209 instructs the communication device 110c to initiate provisioning to the selected HO 130a. In step S619, the connectivity management unit 307 in the communication device 111c performs provisioning to the selected HO 130a by performing steps S407 and S414 to S418.

In case of initial provisioning, the mediation server 101 does not have connection with the communication devices 110b and 110c at the time of step S608. In order to make this connection, the user 140 may turn on the power of the communication devices 110b and 110c so as to perform the steps S602 to S607. The way to make connection is not limited to this example.

A modification will now be described. In step S601, the user 140 may also input a group list to the communication device 110a. The group list may specify a group of communication devices which the user 140 requests to be provisioned simultaneously, and include the names of the communication devices in the group where the device name may be the PCID or other information representing the communication devices. The communication device 110a may send the group list to the mediation server 101 in step S607. In step S608, the GPF 209 may specify communication devices in the group based on the received group list, instead of accessing the group information database 800. In case that the group information is pre-configured in the group information database prior to the initial provisioning of the communication devices, the group ID may be used to indicate the intended group of the communication devices and the GPF 209 may access the group information database 800 to retrieve all the information of the communication devices.

Figure 7:
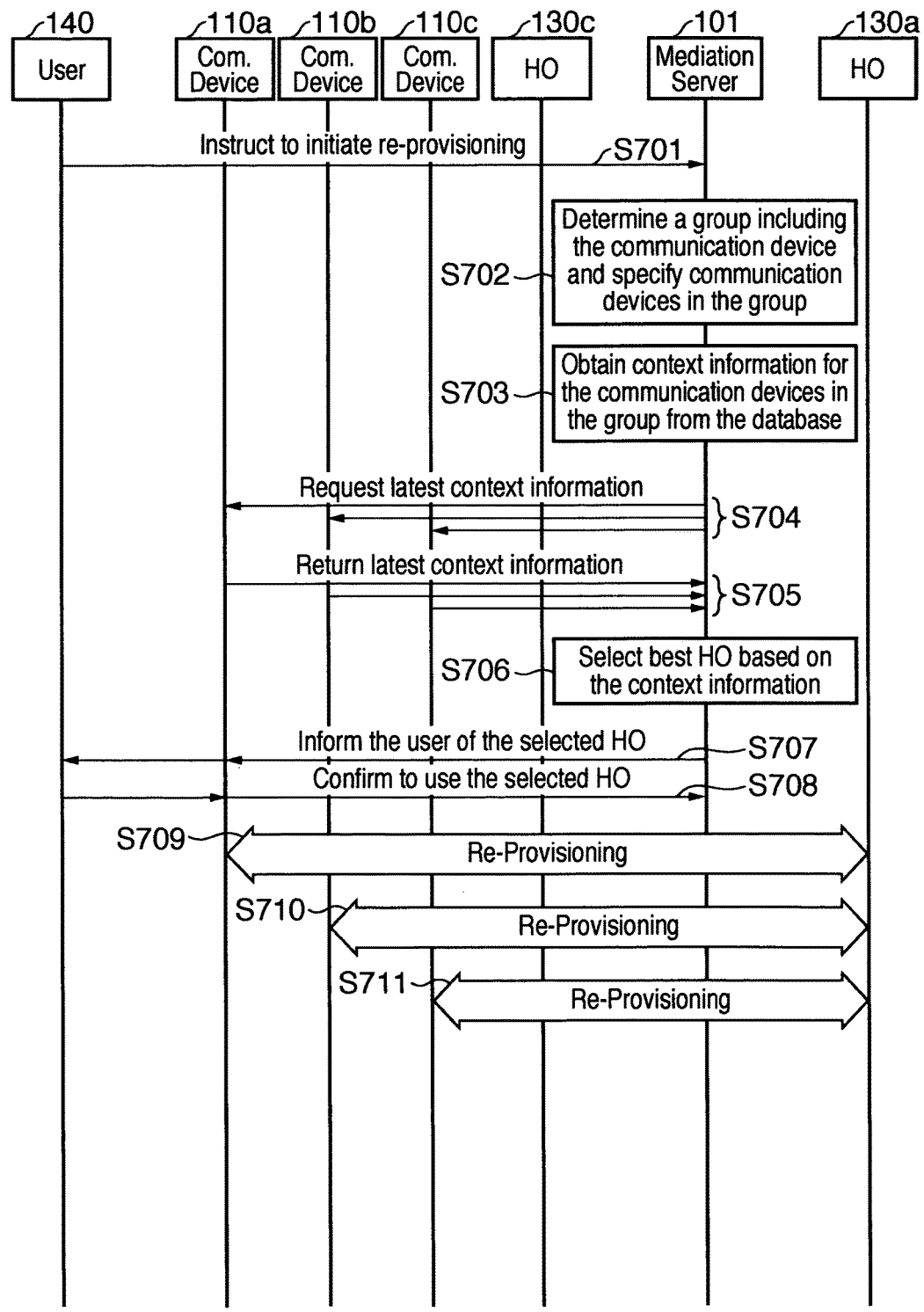
FIG. 7 illustrates a sequence diagram illustrating an MCIM re-provisioning procedure according to another embodiment of the present invention.

FIG. 7 is an exemplary sequence diagram illustrating an MCIM re-provisioning procedure according to another embodiment of the present invention. According to this embodiment, it is assumed that a group of the communication devices 110, for example the communication devices 110a-110c, are re-provisioned using connectivity provided by the current SHO, for example the HO 130c.

In step S701, the user 140 instructs the communication device 110a to initiate re-provisioning with the device information of the communication devices 110a via, for example, the user interface 303 of the communication device 110a.

Steps S702 to S708 are similar to steps S608 to S614 and thus explanation of these steps is omitted. In steps S709 to S711, each of the communication devices 110a-110c performs re-provisioning by performing steps S508 to S516.

Modifications of the above embodiments will now be described. The user 140 may specify HOs from which the SHO is selected and send the list of the specified HOs to the mediation server 101. The CPF 208 may select an HO as an SHO from the specified HOs, based on context information. The user 140 may specify one HO from the HOs 130a-130c. In this case, the CPF 208 may use the specified HO as an SHO without performing selection based on context information.

In above embodiments, the user 140 makes trigger to initiate the request for provisioning. However, the communication device 110 may automatically initiate provisioning when the current subscription expires or a timer set by the user 140 is expires, or when the communication device 110 detects change in its context information such as radio access condition.

According to embodiments mentioned above, a user of a communication device can be connected to the network operator which provides the best service. Furthermore, a user who owns a plurality of communication devices need not take separate actions for each communication devices during provisioning procedure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A mediation server for mediating subscription information to a plurality of communication devices from a network operator providing network connectivity, the mediation server comprising:
a processor;
a memory coupled to the processor, wherein the memory comprises computer readable program code that when executed by the processor causes the processor to perform operations comprising:
receiving a request for provisioning subscription information to one of the plurality of communication devices, along with device information of the one of the plurality of communication devices, wherein the device information includes data needed to obtain subscription information from the network operator;
responding to the request for provisioning subscription information by obtaining a group comprising the plurality of communication devices including the one of the plurality of communication devices for which the provisioning is requested;
selecting, using context information of the plurality of communication devices included in the group, the network operator, among a plurality of network operators that are able to provide network connectivity to the plurality of communication devices, that provides a highest average, over all of the plurality of communication devices in the group, radio strength to the plurality of communication devices in the group; and sending, to the network operator, a request for each subscription information used for each of the plurality of communication devices in the group to connect to the network operator, with the device information of the plurality of communication devices in the group, wherein the network operator is commonly used for all of the plurality of communication devices in the group, wherein the context information comprises radio signal condition information with respect to each of the plurality of network operators for each of the plurality of communication devices in the group, and wherein the selecting comprises selecting for the group, using the context information comprising the radio signal condition information with respect to each of the plurality of network operators for each of the plurality of communication devices in the group, the network operator that provides the highest average radio strength to the plurality of communication devices in the group.

2. The mediation server according to claim 1, wherein the receiving comprises receiving the request for provisioning subscription information from the one of the plurality of communication devices in the group.

3. The mediation server according to claim 1, wherein the responding comprises specifying a group including the communication device from which the request for provisioning subscription information is received.

4. The mediation server according to claim 1, wherein the processor further performs operations comprising:
managing the context information of each communication device included in the group, wherein the context information includes data relating to network operator service, and
wherein sending the request comprises sending the request, for each subscription information used for each of the plurality of communication devices in the group, to the selected network operator.

5. The mediation server according to claim 1, wherein the processor further performs operations comprising:
receiving the subscription information for each communication devices from the selected network operator, and
transmitting each of the received subscription information to each communication device in the group.

6. The mediation server according to claim 1, wherein the receiving comprises receiving the group from the communication device.

7. The mediation server according to claim 1, wherein the processor further performs operations comprising:
storing a group list describing communication devices in a group,
retrieving a group that includes the communication device whose device information is obtained from the group list.

8. The mediation server according to claim 1, wherein the communication devices are Machine to Machine Equipments and the subscription information includes a Machine Communications Identity Module.

9. The mediation server according to claim 4, wherein the context information includes at least one of radio signal condition measured at the communication device, location information of the communication device, a capability of the communication device, velocity of the communication device, and information about service provided by the network operator.

10. A method for mediating subscription information to a plurality of communication devices from a network operator providing network connectivity, comprising:
Receiving, by a mediation server, a request for provisioning subscription information to a communication device among the plurality of communication devices, along with device information of the communication device, wherein the device information includes data needed to obtain subscription information from the network operator;
responsive to the request for provisioning subscription information, obtaining, by the mediation server, a group comprising the plurality of communication devices including the communication device for which the provisioning is requested;
selecting, by the mediation server, using context information of the plurality of communication devices included in the group, the network operator, among a plurality of network operators that are able to provide network connectivity to the plurality of communication devices, that provides a highest average, over all of the plurality of communication devices in the group, radio strength to the plurality of communication devices in the group; and
sending, by the mediation server, a request, to the network operator, for subscription information used for the communication devices in the group to connect to the network operator, with the device information of the communication devices in the group,
wherein the network operator is commonly used for all of the plurality of communication devices in the group,
wherein the context information comprises radio signal condition information with respect to each of the plurality of network operators for each of the plurality of communication devices in the group, and
wherein selecting the network operator comprises selecting, using the context information comprising the radio signal condition information with respect to each of the plurality of network operators for each of the plurality of communication devices in the group, the network operator that provides the highest average radio strength to the plurality of communication devices in the group.

11. The method of claim 10, further comprising
managing the context information of each communication device included in the group, wherein the context information includes data relating to network operator service; and
sending the request, for each subscription information used for each of the plurality of communication devices in the group, to the selected network operator.

12. The method of claim 10, further comprising
receiving the subscription information for each of the plurality of communication devices from the selected network operator, and
transmitting each of the received subscription information to each communication device in the group.

13. The method of claim 10, further comprising
storing a group list describing communication devices in a group; and
retrieving a group that includes the communication device whose device information is obtained from the group list.

14. The method of claim 10, wherein the communication devices are Machine to Machine Equipments and the subscription information includes a Machine Communications Identity Module.

15. The method of claim 10, wherein the context information includes at least one of radio signal condition measured at the communication device, location information of the communication device, a capability of the communication device, velocity of the communication device, and information about service provided by the network operator.

\* \* \* \* \*